May 6, 1930.  H. WATERFALL  1,757,754
ANTISPLASH TIRE
Filed July 7, 1928

INVENTOR.
Harold Waterfall
BY
ATTORNEY

Patented May 6, 1930

1,757,754

UNITED STATES PATENT OFFICE

HAROLD WATERFALL, OF NEW YORK, N. Y.

ANTISPLASH TIRE

Application filed July 7, 1928. Serial No. 290,943.

This invention relates generally to vehicle tires, and has more particular reference to an anti-splash tire.

The invention has for an object the provision of a device of the class mentioned which is of simple durable construction, desirable and efficient in action, and which can be manufactured and sold at a reasonable cost.

The invention proposes the use of a rubber mud guard vulcanized or made onto the outer cover of a tire so as to normally be disposed approximately 3/4" from the outer periphery of the cover. It is estimated that the weight of a vehicle flattens properly blown tires about 1/2" so that the mud guard clearance relative to a level road would be about 1/4", but when a depression in a road is encountered the mud guard would touch the ground by reason of the sudden fall into the depression, therefore preventing splashing on the sidewalk. The mud guard may be adapted for having its edges rolled so that adjustments of the distance between the outer periphery of the cover and the outer periphery of the mud guard may be made.

For further comprehension of the invention, and of the object and advantages thereof, reference will be had to the following description and accompanying drawings, and to the appended claim in which the various novel features of the invention are more particularly set forth.

In the accompanying drawing forming a material part of this disclosure:

Figure 1:
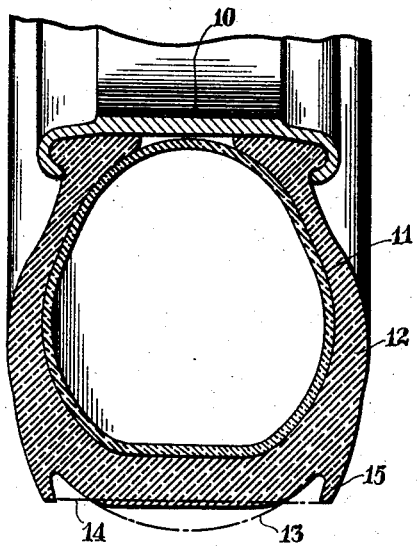
Fig. 1 is a transverse sectional view of a tire constructed according to this invention.
Figure 2:
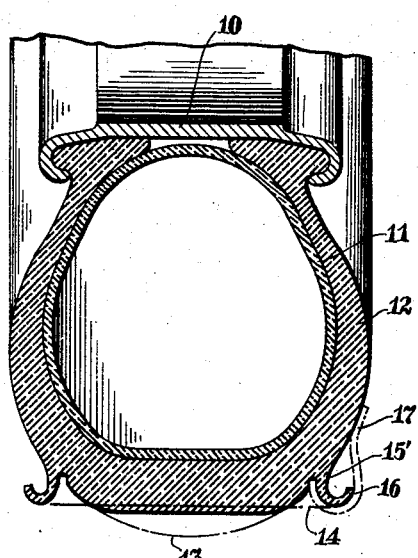
Fig. 2 is a transverse sectional view of a tire constructed according to a modified form of the invention.

The reference numeral 10 indicates generally the inner rim of a tire having an inner tube 11 and a cover 12. The dot-dash line 13 indicates the normal shape of the tire without load, and the full line flattened bottom of the tire indicates its shape with vehicle load thereon, assumption being made that the tire is fully inflated. The dot-dash line 14 indicates the line of additional flattening due to the vehicle suddenly entering a depression in a road. An anti-splash mud guard 15 is formed integral with the cover 12 and has its lower edge aligned with the theoretical line 14, and is disposed on the outer side of the tire.

In the normal running of the vehicle on level ground the outer edge of the mud guard 15 does not touch the ground, but in the event that a depression in a road is encountered, the shock of falling into the depression further flattens the tire and then the mud guard 15 touches the ground. Ordinarily when a depression is entered on rainy days water will splash therefrom, but the mud guard 15 in the instant case prevents such splashing.

In the modified form of the device illustrated on the drawing, the antisplash mud guard 15' has its outer edge rolled inwards as shown at 16, and the arrangement is such that the outermost element of the mud guard 15' aligns with the theoretical line 14. At intervals along the mud guard 15' straps 17 are positioned and the outer ends of these straps are attached to the tire cover 12 at points forming the junction of the tire cover 12 and the mud guard, while the inner ends of the straps are adjustably secured to the tire cover at points above the mud guard 15'. These straps are arranged for holding the mud guard with its outer edge rolled inwards and the mud guard being of elastic flexible material tends to assume a straight position.

Each of the straps 17 are formed with a plurality of apertures 18 and studs 19 project from the cover 12 and pass thru one of these apertures, and nuts 20 are engaged on the studs. For adjusting the distance between the periphery of the tire and the periphery of the mud guard, the nuts 20 should be removed, and the straps 17 moved to engage different apertures 18 upon the studs 19 and then reengaging the nuts. The adjustable feature eliminates precision work upon the mud guard when the tire is initially manufactured. The mud guard may be roughly cut to an oversize and thereafter adjusted for providing the proper diameter.

Figure 3:
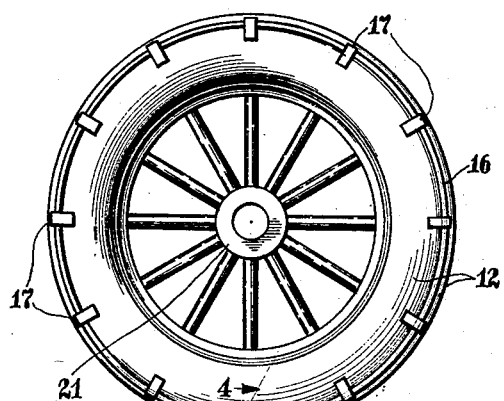
Fig. 3 is a side elevational view of the tire shown in Fig. 2.
Figure 4:
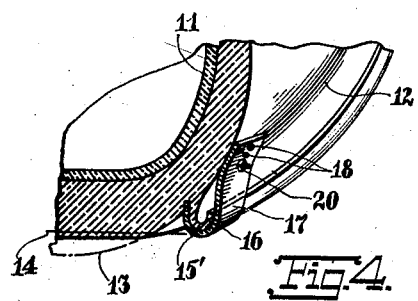
Fig. 4 is a fragmentary sectional perspective view, taken on the line 4—4 of Fig. 3.
Figure 6:
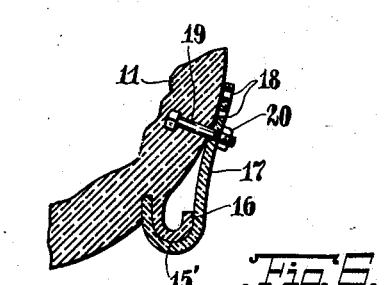
Fig. 6 is a fragmentary sectional view, taken on the line 6—6 of Fig. 5.
Figure 5:
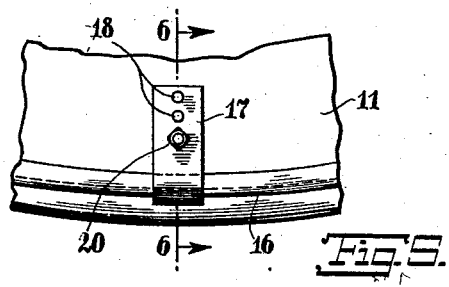
Fig. 5 is a fragmentary enlarged detail view of the tire shown in Fig. 3.

In Fig. 3 the tire is shown engaged on a wheel 21.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention what I claim as new and desire to secure by United States Letters Patent is:

In an anti-splash tire, a casing, an anti-splash mud guard consisting of a thin annular member integral therewith, the outer edge of said mud guard being rolled inwards, said mud guard projecting from the side of said casing near the outer periphery thereof and running around the circumference of the casing, a plurality of straps having hook-shaped parts at one end engaging said rolled edge to hold it in position, the other end lying flat against the side of the casing, and having a plurality of apertures, studs threaded at their free end projecting from the side of said casing, each of said studs engaging one of the apertures in the straps, and nuts engaging said studs at their threaded ends, whereby the straps may be adjusted radially of said casing and held against the side thereof.

In testimony whereof I have affixed my signature.

HAROLD WATERFALL.